(No Model.)
A. H. BOWMAN & C. B. ROSENBERGER.
FASTENING DEVICE.
No. 580,593. Patented Apr. 13, 1897.
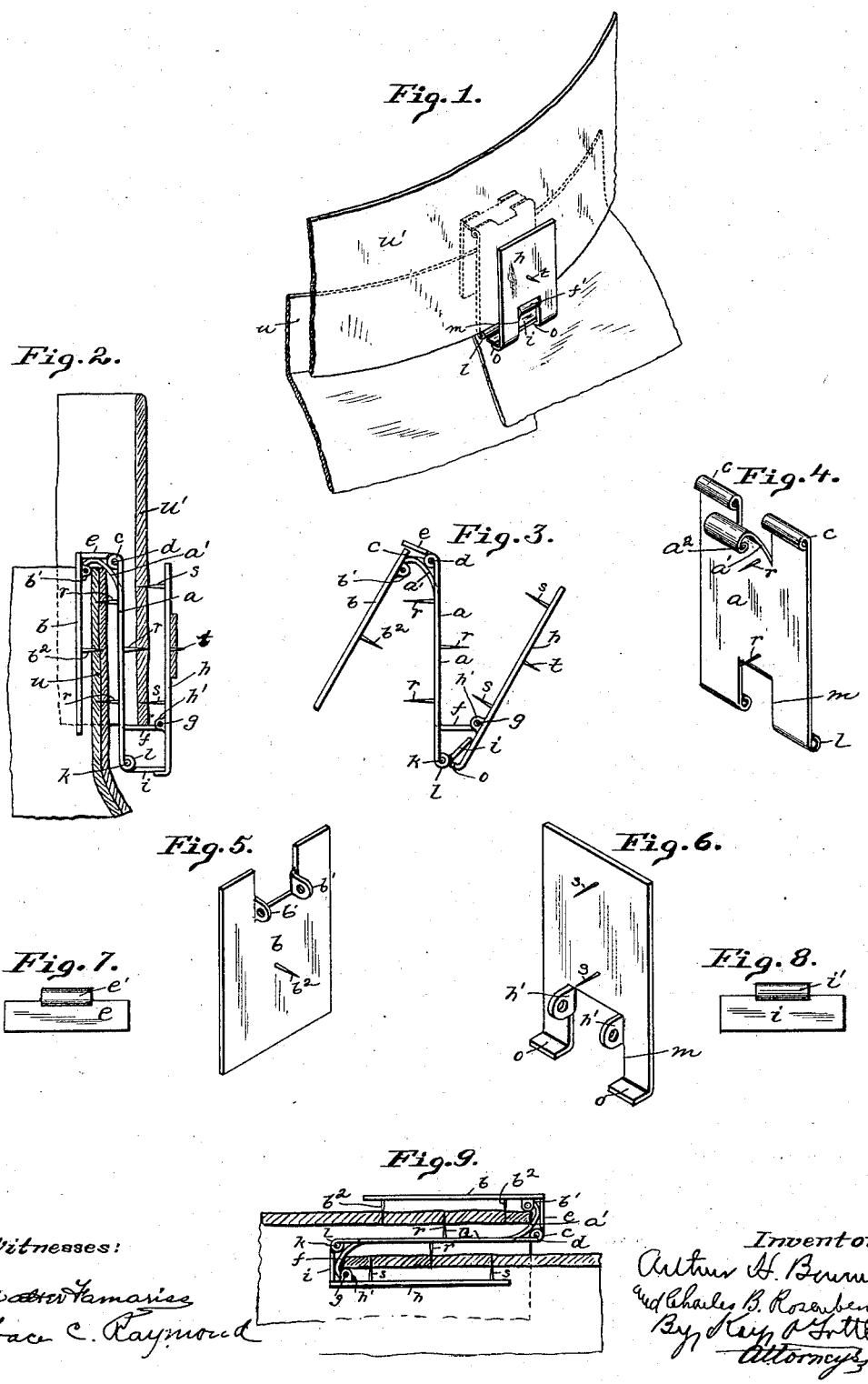

UNITED STATES PATENT OFFICE.

ARTHUR H. BOWMAN AND CHARLES B. ROSENBERGER, OF PITTSBURG, PENNSYLVANIA.

FASTENING DEVICE.

SPECIFICATION forming part of Letters Patent No. 580,593, dated April 13, 1897.

Application filed May 29, 1896. Serial No. 593,538. (No model.)

*To all whom it may concern:*

Be it known that we, ARTHUR H. BOWMAN and CHARLES B. ROSENBERGER, residents of Pittsburg, in the county of Allegheny and State of Pennsylvania, have invented a new and useful Improvement in Fastening Devices; and we do hereby declare the following to be a full, clear, and exact description thereof.

Our invention relates to fastening devices such as may be employed in fastening collars to the neckbands of shirts or cuffs to the wristbands, although we do not wish to limit ourselves to this particular use of the invention.

One of the chief objects of our invention is to provide a simple device for fastening collars or cuffs to the bands of the shirt, whereby they are held securely in place without the employment of buttonholes or collar-buttons.

Our invention comprises, generally stated, a plate having wings hinged on both sides thereof and projecting points adapted to engage the material interposed between said plate and wings, together with latches which act by gravity to lock said wings in contact with the material.

To enable others skilled in the art to make and use our invention, we will describe the same more fully, referring to the accompanying drawings, in which—

Figure 1 is a view of our invention as applied to a collar and collar-band. Fig. 2 is an enlarged side view of the device, showing it engaging the material. Fig. 3 is a side view with the wings thrown open. Fig. 4 is a perspective view of plate. Figs. 5 and 6 are perspective views of wings. Figs. 7 and 8 are views of latches. Fig. 9 is a view of the invention as applied to the fastening of cuffs.

Like letters indicate like parts in each of the figures.

While the drawings show our invention as applied to the fastening of collars and cuffs to the bands of shirts, we do not wish to limit ourselves to this particular application of the invention, but desire to extend it to such other uses to which it may be found applicable.

In the drawings the letter $a$ designates a plate of suitable size and thickness, formed of any suitable metal, such as brass, aluminium, silver, &c. The other parts hereinafter referred to may be formed from corresponding metals. The plate $a$ has the tongue $a'$ extending out from its front face at the upper end of said plate, said tongue having the bearing $a^2$ formed thereon. Hinged to the bearing $a^2$ is the wing $b$, said wing having the lugs $b'$ formed thereon. A pin passes through openings in said lugs $b'$ and through said bearing $a^2$, and thus forms a hinge-joint between said plate and wing, whereby said wing is permitted to swing freely when not locked in the manner hereinafter set forth. The wing $b$ has the prong $b^2$ formed thereon.

The upper end of the plate $a$ has the bearings $c$. A pin $d$, passing through a bearing $e'$ on the latch $e$, hinges said latch on said plate. This latch $e$ swings freely on its bearing by its own weight and of its own accord engages the upper end of the wing $b$, above the point where said wing is hinged to said plate. When locked in this way by the latch $e$, the upper end of said wing is not free to swing toward the plate $a$.

The rear face of the plate $a$ at its lower end has a tongue $f$, with a bearing $f'$ formed thereon. A pin $g$, passing through bearings $h'$ on the wing $h$, hinges said wing $h$ to said plate. A second latch $i$ is hinged to the lower end of the plate $a$ on its rear face by means of a pin $k$, passing through the bearings $l$ on the plate $a$ and the bearing $i'$ on the latch $i$. This latch $i$ also swings freely on its bearing and drops into place by its own gravity when it locks the wing $h$. The lower end of the wing $h$ is cut away, as at $m$, to permit of the latch $i$ being raised to free the wing $h$, as will more fully hereinafter appear. The wing $h$ has the inwardly-projecting lips $o$, with which the latch $i$ engages when lowered. The wings may be formed of wire, if desired.

The plate $a$ has the prongs $r$ on its front and rear faces, and the wing $h$ has the prongs $s$ on its front face. On the rear face of the wing $h$ is the prong $t$, which engages with the necktie and prevents its slipping up over the collar.

When our invention is employed for fastening the collar to the neckband of a shirt, the latch $e$ is thrown back out of engagement with the upper end of the wing b, so that the lower end of said wing is free to swing out to the position shown in Fig. 3. The neckband u of the shirt enters between the wing b and the front face of the plate a. The wing b is then swung back, so that the prongs r and b² are forced into the neckband from both sides. The latch e drops down to engage the upper ends of the wing b, as shown in Fig. 2. The latch when allowed to drop down in this position locks the wing b, so that the neckband u is securely held between the wing and plate a. As long as the wing b is locked in this manner the fastener is securely held to the neckband. The device is now ready to receive the collar, which is fastened in the following manner: By slipping one's finger into the opening m the latch i may be quickly raised, whereupon the wing h will fall back into the position shown in Fig. 3. The collar u' can then be slipped down between the wing h and the rear face of the plate a. After the collar has been thus inserted by pushing in the upper end of the wing h, the latch e drops of its own accord and the wing is locked in that position. The collar prevents the upper end of the wing h from swinging in and the latch i prevents the lower end, so that the collar is held securely within the fastener. The prongs r and s are forced into the collar and further act to prevent its withdrawal.

In Fig. 9 we have illustrated our invention as applied to the attachment of cuffs to the wristbands. The only difference between this form and that just described is that the wing h has not the inwardly-projecting lips o. Furthermore, the latch i is hinged to the wing h in the same manner as the latch e.

What we claim as our invention, and desire to secure by Letters Patent, is—

1. In a fastening device the combination of a plate, wings hinged on both sides thereof at opposite ends, latches hinged to said plate and adapted to drop of their own accord into engagement with the ends of said wings adjacent to the hinged connection, substantially as set forth.

2. In a fastening device the combination of a plate, wings hinged on both sides thereof at opposite ends, latches hinged on said plate and adapted to drop of their own accord into engagement with the ends of said wings adjacent to the hinged connection, said plate and wings having pointed projections thereon, substantially as set forth.

3. In a fastening device the combination of a plate, tongues on both sides of said plate on opposite ends thereof, wings hinged to said tongues, swinging latches on said plate adapted to drop of their own accord and engage with the ends of said wings adjacent to the hinged connection, substantially as set forth.

In testimony whereof we, the said ARTHUR H. BOWMAN and CHARLES B. ROSENBERGER, have hereunto set our hands.

ARTHUR H. BOWMAN.
    CHARLES B. ROSENBERGER.

Witnesses:
    ROBT. D. TOTTEN,
    ROBERT C. TOTTEN.